March 24, 1953   F. M. C. USHER   2,632,274
FISH LURE
Filed Nov. 14, 1949

Inventor
FRANCIS M. C. USHER,
By Munn, Liddy & Glaccum
Attorneys

Patented Mar. 24, 1953

2,632,274

UNITED STATES PATENT OFFICE 2,632,274

FISH LURE

Francis M. C. Usher, Hickman, Ky.

Application November 14, 1949, Serial No. 126,978

5 Claims. (Cl. 43—35)

This invention relates to fishing lures of either the floating or underwater type, and more specifically to a lure which is particularly adapted to be used in heavily weeded surroundings.

It is an object of the present invention to provide a fish lure with a normally enclosed hook which is resiliently biased in its enclosed position, but is capable of being drawn out of its housing when struck by a fish. As the hook is withdrawn it engages the mouth of the fish and maintains a hold therein.

Another object of the invention is to detachably mount a conical shaped cap on the forward end of the device to give a streamlining effect to the lure and to prevent weeds and the like from becoming entangled therewith.

A further object of the present invention is the provision of a hook which is connected to the conical cap and resiliently biased, as aforesaid, and is slidably mounted in a runway or trough, the resilient biasing means being connected to the forward end of the hook and one end of the lure.

Still another object is to provide a lure of the character described in which the body portion thereof includes spaced cellular rubber members to allow the lure to float near the surface of the water. Other pieces of rubber may be placed at various places on the lure to assist the cellular material in providing a soft bite for the fish and to give the lure a more life-like appearance.

Still other objects and advantages will become apparent from the following description of the present invention illustrated in the accompanying drawing, in which.

Similar reference characters represent similar parts in the several figures.

The present device comprises a flat base plate 10 which extends longitudinally of the device. The plate is rectangular in plan and acts as a means to which the other portions of the device may be attached. At each end of the plate 10 pairs of spaced apart vertically extending prongs 11—12 and 13—14 are provided, said prongs being integral with the plate 10. The use of these prongs will be explained further on in the description.

Figure 1:
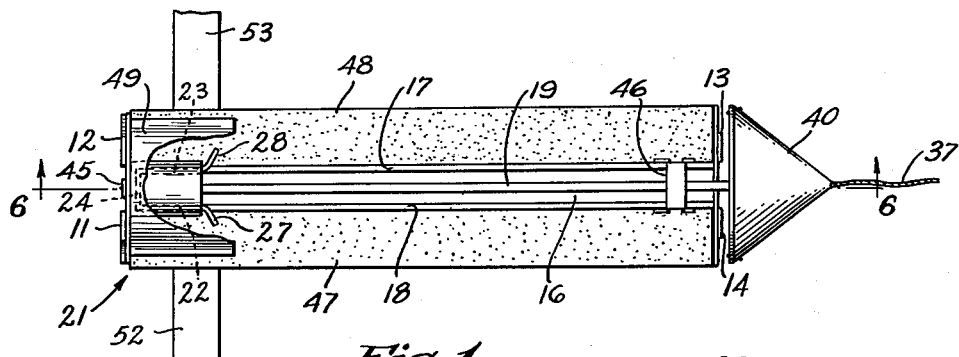
Figure 1 is a top plan view of the device having a portion thereof broken away.
Figure 2:
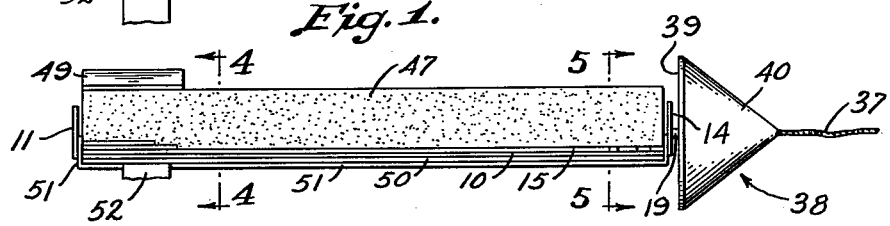
Figure 2 is a side elevational view.
Figure 3:
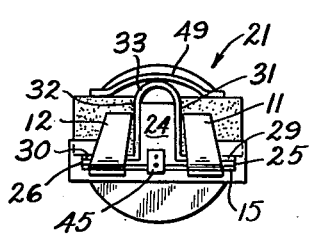
Figure 3 is an end view of Figure 2 taken at the left hand end thereof.
Figure 4:
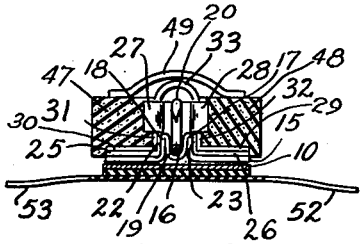
Figure 4 is a cross sectional view taken on line 4—4 of Figure 2.
Figure 5:
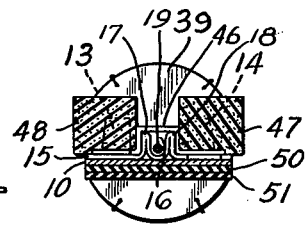
Figure 5 is a cross sectional view taken on line 5—5 of Figure 2.

Mounted over the base plate 10 is a second plate 15, said plate 15 being of the same general rectangular configuration of plate 10, but being provided with a U-shaped trough or guide 16 extending longitudinally thereof. As will be seen from Figures 1 and 4, the trough 16 has side walls 17 and 18 which extend vertically a substantial distance. It is this trough which is adapted to partially surround and form a guideway for the shank 19 of the hook 20.

A housing 21 is provided at one end of the fishing lure for enclosing the hook portion 20. This housing is necessary to prevent the hook from lodging on intense vegetable growth as the lure is passed therethrough. The housing, as will be seen from Fig. 1, includes a U-shaped member having vertical side walls 22 and 23 and a back portion 24. Laterally extending feet portions 25 and 26 are formed integral with the lower side of walls 22 and 23 respectively. These feet are adapted to lie parallel with and adjacent the upper or second plate 15. It is to be noted that the forward end of the vertical side walls 22 and 23 of the U-shaped housing are provided with outwardly flared flanges 27 and 28, respectively, which are also formed integral therewith. These flanges are utilized to assist in placing the hook into the space between side walls 22 and 23 when the hook is being moved rearwardly.

Back portion 24 of the housing acts as a stop means to limit the rearward movement of hook 20. As will be noted from Fig. 1, the U-shaped member is open at its upper end. To cover this an inverted U-shaped member is furnished having laterally extending feet 29 and 30 which are adapted to lie adjacent feet 25 and 26, respectively. The side walls 31 and 32 are adapted to lie against side walls 22 and 23, respectively, of the first named U-shaped housing portion. The upper arcuate portion of the inverted U-shaped member, illustrated by numeral 33, is adapted to prevent the hook 20 from being raised out of the housing. In other words, it acts as a stop means for limiting the vertical movement of the hook when it is in its rearward position.

At the forward end of the fishing lure the forward end of shank 19 is provided with a pair of oppositely extending projections 34 and 35 and a forwardly extending projection 36. These projections are formed by bending the wire outwardly and then back on itself. It will be seen from Fig. 6 that an eye 36a is formed by the forward projection 36 which is used to connect the fishing line 37 to the hook shank 19. Adjacent the upper projection 34 and rearwardly spaced therefrom is provided a vertical extension 34a.

A weeder head 38 is detachably mounted on the forward end of shank 19 and completely encloses extensions 34, 35 and 36. The weeder head is conical in shape and is provided with a circular base portion 39 and a side portion 40 which terminates in an apex 41 which is provided with an aperture to allow the fishing line 37 to be pulled therethrough. The base portion 39 is provided with an aperture 42 which is slightly larger than the diameter of the hook shank 19. However, this base portion is made of a pliable material, such as rubber, so that by pulling on one edge of the base portion the aperture can be enlarged into an elongated shape so that it can be removed over the vertical extensions 34 and 35. This of course facilitates changing the hook, a line, or if desired, to change to another size weeding head.

As previously stated, the hook is normally enclosed by the housing 21 but will be withdrawn therefrom when the lure is struck by a fish. It is desirable therefore to provide a resilient means for keeping the hook normally in the housing but allowing the withdrawal of the hook therefrom when desired. I therefore provide an elastic band 42 for this purpose. One end of the band is connected to the hook-like projection 34a at the forward end of shank 19. The other end of the band is inserted through an eye 43 at the hook end of the shank 19 and thence through an aperture 44 in the back 24 of the housing and connected to a member 45 which abuts the housing back 24.

Near the forward end of the lure and connecting the upper ends of the trough walls 17 and 18 is a cross member 46 which prevents the hook shank 19 from rising above the trough and acts as a stop means to keep the hook from leaving the trough as it is pulled forwardly.

To give the lure a more life-like appearance I have provided a pair of laterally spaced longitudinally extending cellular rubber members 47 and 48. The cellular rubber members are positioned adjacent the side walls of the trough and extend laterally slightly beyond the edge of plates 10 and 15. It will be noted that members 47 and 48 extend vertically beyond the hook 20. Also a leather or rubber arcuate shaped member 49 is used to cover the inverted U-shaped member 33 and connects the rear ends of members 47 and 48. The attachment may be by any convenient means. Beneath the base plate a sheet of rubber 50 is furnished to cover up the base plate. In other words, it prevents exposure of the metallic plate to the surroundings. A further sheet of rubber 51, which is thinner than sheet 50 and adapted to slip over vertical prongs 11, 12, 13 and 14 at each end of the lure, is provided to give same a further life-like appearance to the lure. For example, wing-like appendages 52 and 53 may be provided on the sheet. Various types of these latter rubber members may be used, they being easily and quickly changed from one to the other.

While no particular means has been set forth for connecting the various parts together, it is understood that various means could be used such as gluing or welding.

The operation of this artificial fish bait is very novel and extremely effective. The action of the various parts will be more readily understood if the assembly is somewhat broken down into its component parts. To attach the line 37 to the lure the detachable weeder head 38 should be removed from the device.

The line should be threaded through the aperture in the apex of the head and also through the aperture 42 in the base 39. The threaded end of the line may then be secured in the eye 36 at the forward end of the hook shank 19. After this connection is made the aperture 42 can be enlarged so that it can be placed over projections 34 and 35 and the cap will again be in place. It will, therefore, be seen that the hook and the weeder head will move as one single unit relative to the rest of the lure, the hook and its shank slidably mounted in the trough 16. It is desirable that the hook 20 stay within the housing 21 while in operation to prevent the hook from being snagged under water vegetation. However, when the fish strikes the lure and impresses its mouth down on the intermediate portion thereof, it will be seen that the hook 20 and the head 38 will move forward relative to the body of the lure, causing the hook 20 to come in contact with the mouth of the fish.

Figure 6:
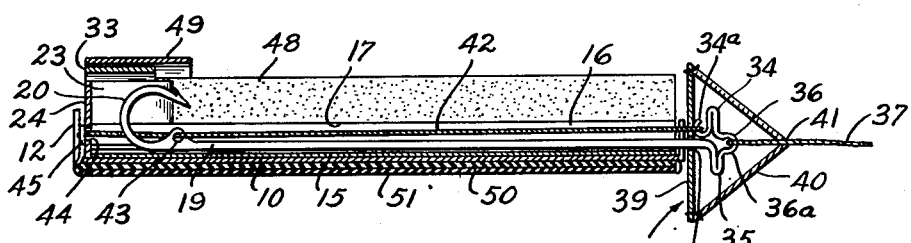
Figure 6 is a longitudinal sectional view taken on line 6—6 of Fig. 1.

To keep the hook in the housing 21 the rubber band 42 is used and as will be noted from Fig. 6, is connected to the projection 34a in the forward end of the shank 19, and is threadingly received by the hook eye 43 and is connected to the housing back 24. Therefore, as the head is pulled forward the rubber band guides the hook by means of the eye and prevents, to some extent, the hook rising out of the trough. After the hook has come forward and has hooked the fish, the fish may then be drawn in by the line. As will be seen, as soon as the hook is withdrawn from the mouth of the fish it will be immediately pulled to the housing 21 and enclosed therein. By having the rubber band 42 guiding the hook it will always find its position in the housing. Also, to further assist the hook in finding its position in the housing flanges 27 and 28 are used.

This lure, owing to its construction with the relatively movable weeding head, can be worked through and over heavy vegetation as all resistance is against the head itself, leaving the hook 20 completely enclosed in the housing. However, as explained above, when the fish bites the lure body it is pulled rearwardly away from the weeding head, dislodging the point of the hook from its housing, and thereby hooking the fish.

While I have shown and described a preferred form of my invention, it will be understood that variations in details of form may be made without departure from the invention as defined in the appended claims.

I claim:

1. A fishing lure comprising an elongated base member, a housing positioned at one end thereof, said housing having an opening therein, said base member being furnished with a guideway extending longitudinally thereof in communication with said opening in said housing, a hook having a shank portion integral therewith, said shank being slidably mounted in said guideway and having an eye at the free end thereof for attaching a line thereto, said free end being the end of the shank opposite to the end integral with said hook, said shank having a second eye adjacent the hook portion, and means inserted through said second eye and connecting the free end of the shank and the housing resiliently biasing said hook within the housing.

2. A fishing lure comprising an elongated base member, having a housing positioned at one end thereof, said housing having an opening therein with outwardly flared flanges on opposite sides thereof, said base member having a trough-like guideway extending lengthwise thereof in communication with said opening, a fishing hook having a shank portion slidably mounted in said guideway, means on one end of the shank for attaching a line thereto, and means connecting said one end of the shank and the housing, said connecting means being adapted to resiliently bias said hook within the housing.

3. A fishing lure comprising an elongated base member having a vertically extending housing positioned at one end thereof, said housing having an opening therein, said base member having a guideway extending longitudinally thereof in communication with said opening provided in said housing, outwardly flared flanges mounted on opposite sides of said opening, a hook normally positioned in said housing and having a shank slidable in said guideway, means for connecting a line to one end of the shank, and means resiliently biasing said hook within the housing.

4. A fishing lure comprising an elongated base member having vertically extending prongs on the ends thereof for detachably connecting wing-like appendages thereto, a housing positioned at one end thereof, said housing having an opening therein, said base member being provided with a guideway extending longitudinally thereof in communication with said opening in said housing, cellular rubber members on opposite sides of said guideway, a hook having a shank portion integral therewith which is slidably mounted in said guideway, one end of the shank being provided with an eye for attaching a line thereto, and means normally holding said hook within the housing.

5. A fishing lure comprising an elongated base member, a housing positioned at one end thereof, said housing having an opening therein, said base member having a guideway extending longitudinally thereof in communication with said opening in said housing, said guideway having a pair of upstanding side walls spaced from the sides of the base member, cellular rubber members positioned adjacent each side wall of said guideway, a hook having a shank portion integral therewith, said shank being slidably mounted in said guideway and having an eye on one end thereof for attaching a line thereto, means connecting the said shank with the housing for normally holding the hook therein, and stop means connecting the side walls of said guideway above the shank resting in the guideway.

FRANCIS M. C. USHER.

REFERENCES CITED

The following references are of record in the file of this patent:

UNITED STATES PATENTS

| Number | Name | Date |
|---|---|---|
| 986,088 | Scott | Mar. 7, 1911 |
| 1,609,151 | Bruenig | Nov. 30, 1926 |
| 1,768,033 | Deatz | June 24, 1930 |
| 1,993,018 | Pfeifle | Mar. 5, 1935 |
| 2,241,367 | Sarff | May 6, 1941 |
| 2,325,107 | Burns | July 27, 1943 |

FOREIGN PATENTS

| Number | Country | Date |
|---|---|---|
| 13,535 | Great Britain | 1885 |